US008745362B2

(12) United States Patent
Bell, Jr. et al.

(10) Patent No.: US 8,745,362 B2
(45) Date of Patent: Jun. 3, 2014

(54) OPERATING SYSTEM AWARE BRANCH PREDICTOR USING A DYNAMICALLY RECONFIGURABLE BRANCH HISTORY TABLE

(75) Inventors: Robert H. Bell, Jr., Austin, TX (US); Wen-Tzer Thomas Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 12/823,288

(22) Filed: Jun. 25, 2010

(65) Prior Publication Data

US 2011/0320793 A1 Dec. 29, 2011

(51) Int. Cl.
*G06F 9/00* (2006.01)
(52) U.S. Cl.
USPC .......................................................... 712/240
(58) Field of Classification Search
None
See application file for complete search history.

(56) References Cited

U.S. PATENT DOCUMENTS

| 6,055,650 | A  | * | 4/2000  | Christie        | 714/39  |
|-----------|----|---|---------|-----------------|---------|
| 6,697,937 | B1 |   | 2/2004  | Henry et al.    | 712/240 |
| 7,069,426 | B1 |   | 6/2006  | Hummel          | 712/240 |
| 7,124,287 | B2 |   | 10/2006 | Prasky et al.   | 712/238 |
| 7,185,182 | B2 |   | 2/2007  | Col             | 712/219 |
| 7,370,183 | B2 |   | 5/2008  | John et al.     | 712/240 |
| 2004/0215720 | A1 | * | 10/2004 | Alexander et al. | 709/204 |
| 2005/0141554 | A1 | * | 6/2005  | Hammarlund et al. | 370/468 |
| 2005/0257035 | A1 |   | 11/2005 | Prasky et al.   | 712/238 |
| 2006/0161762 | A1 | * | 7/2006  | Eisen et al.    | 712/233 |
| 2008/0215866 | A1 |   | 9/2008  | John et al.     | 712/240 |
| 2009/0063831 | A1 |   | 3/2009  | Ekman           | 712/239 |
| 2010/0251160 | A1 | * | 9/2010  | Shafi et al.    | 715/772 |

* cited by examiner

*Primary Examiner* — Jacob A Petranek
(74) *Attorney, Agent, or Firm* — VanLeeuwen & VanLeeuwen; Matthew W. Baca

(57) ABSTRACT

A processor resource manager assigns a branch history resource to a first execution mode. The branch history resource is utilized for predicting a branch direction of a branch instruction. Next, the resource manager logs a number of branch mispredictions that occur while the processor executes a second execution mode. The resource manager, in turn, reassigns the branch history resource to the second execution mode based upon the number of branch mispredictions.

17 Claims, 8 Drawing Sheets

| | Resource Assignment By Timeline | | | | |
|---|---|---|---|---|---|
| BHT Entry | $t_0$ | $t_1$ | $t_2$ | $t_3$ | $t_4$ |
| Entry 0 | User Mode | User Mode | User Mode | Kernel Mode | User Mode |
| Entry 1 | User Mode | User Mode | User Mode | Kernel Mode | User Mode |
| Entry 2 | Kernel Mode | User Mode | Kernel Mode | Kernel Mode | Kernel Mode |
| Entry 3 | Kernel Mode | User Mode | Kernel Mode | Kernel Mode | Kernel Mode |

*FIG. 3A*

| | Entry Updater | Branch Predictor |
|---|---|---|
| BHT Entry Assigned to Execution Mode | Increment/Decrement Based on Branch Resolution Value | Provide Branch History Value Located In BHT Entry |
| BHT Entry Not Assigned to Execution Mode | Hold | Provide "Take Branch" Value |

*FIG. 3B*

OPERATING SYSTEM AWARE BRANCH PREDICTOR USING A DYNAMICALLY RECONFIGURABLE BRANCH HISTORY TABLE

TECHNICAL FIELD

The present disclosure relates to managing a number of branch mispredictions that are generated during various processor execution modes by dynamically reassigning branch history table resources to the various processor execution modes.

BACKGROUND

Some modern processor workloads call for significant operating system processing resources, such as Java server workloads that may utilize a substantial portion (e.g., greater than 50%) of processing resources in kernel execution mode relative to user execution mode. One reason that Java, along with other emerging object-oriented codes, utilizes a large amount of processing resources for operating system activity is due to their tendency towards dynamically executing a large number of branch instructions in kernel execution mode. Computer systems may include a branch predictor that attempts to predict branch directions based upon previously logged branch resolutions. By providing accurate predictions, the branch predictor improves a processor's instruction pipeline flow and improves performance.

SUMMARY

A resource manager assigns a branch history resource to a first execution mode. The branch history resource is utilized for predicting a branch direction of a branch instruction. Next, the resource manager logs a number of branch mispredictions that occur while the processor executes a second execution mode. The resource manager, in turn, reassigns the branch history resource to the second execution mode based upon the number of logged branch mispredictions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein:

FIG. 3A is a table showing resources dynamically assigned to a particular execution mode;

FIG. 3B is a table showing entry updater and branch predictor actions based upon whether a branch history table entry is assigned to a current execution mode;

DETAILED DESCRIPTION

Figure 1:
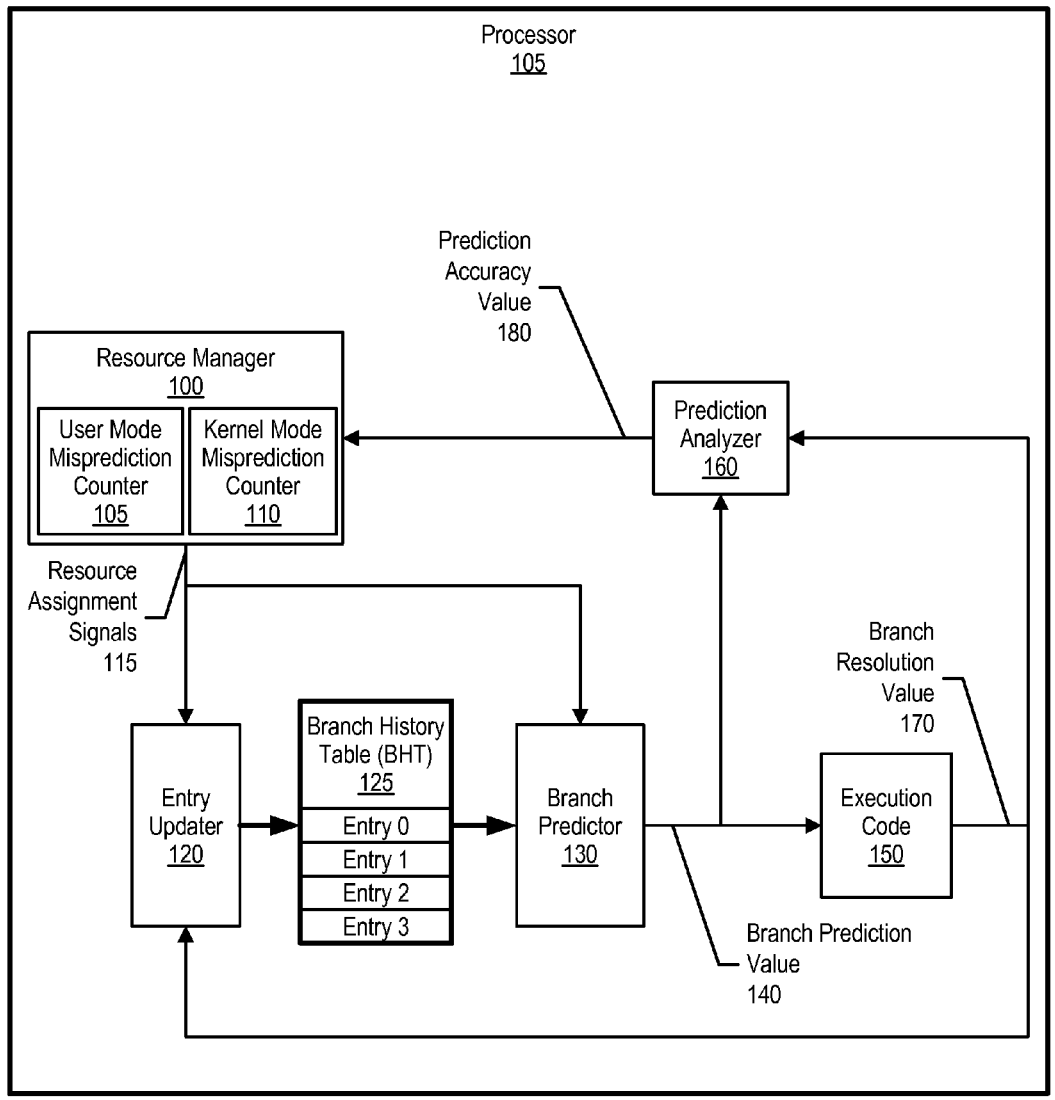
FIG. 1 is a diagram showing a resource manager assigning resources to execution modes based upon branch mispredictions that occur while executing code.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a resource manager assigning resources to execution modes based upon branch mispredictions that occur while executing code. Resource manager 100 assigns branch history table entries to a user execution mode or a kernel execution mode based upon the number of branch mispredictions that occur in each execution mode.

The current disclosure provides embodiments for dynamically reassigning branch history table entries used by a branch predictor in order to accommodate high branch misprediction rates in one of multiple execution modes. Each branch history table entry is assigned to either a user execution mode or a kernel execution mode based upon comparing a number of branch mispredictions that occur in the user execution mode and the kernel execution mode. For example, when the user execution mode generates a large number of branch mispredictions, resource manager 100 reassigns branch history table entries from kernel execution mode to user execution mode in order to better track branch resolution history and, in turn, increase branch instruction prediction accuracy.

Processor 105 includes resource manager 100, which uses user mode misprediction counter 105 and kernel mode misprediction counter 110 to track the number of branch mispredictions that occur when processor 105 operates in user execution mode or kernel execution mode, respectively. Resource manager 100 generates resource assignment signals 115 that inform entry updater 120 and branch predictor 130 as to which execution mode each branch history table entry is assign in branch history table 125. For example, resource assignment signals 115 may indicate that each branch history table entry is assigned to user execution mode. In another example, resource assignment signals 115 may indicate that each branch history table entry is assigned to kernel execution mode. In yet another example, resource assignment signals 115 may indicate that a portion of the branch history table entries are assigned to user execution mode and a portion of the branch history table entries are assigned to kernel execution mode (mixed mode assignment, see FIG. 4 and corresponding text for further details).

During execution, execution code 150 encounters a branch instruction and requests a branch prediction (e.g., "Take Branch" or "Do Not Take Branch"). Based upon the current execution mode (i.e., user execution mode or kernel execution mode), branch predictor 130 retrieves a value from a corresponding branch history table entry and provides branch prediction value 140 to execution code 150. When the corresponding branch history table entry is not assigned to the current execution mode, branch predictor 130 provides a "Take Branch" value as branch prediction value 140. In one embodiment, branch predictor 130 identifies the corresponding branch history table entry by hashing a program counter value that corresponds to the branch instruction's address.

After execution code 150 resolves the branch, execution code 150 provides branch resolution value 170 that indicates whether execution code 150 took the branch, such as a "1" for "took branch" and a "0" for "did not take branch." Prediction analyzer 160 compares branch prediction value 140 with branch resolution value 170 to determine if the branch predictor 130's prediction was correct. In turn, prediction analyzer 160 provides prediction accuracy value 180 to resource manager 100. For example, prediction accuracy value 180 may be a "0" if the branch prediction was correct, and may be a "1" if the branch prediction was incorrect. When the branch prediction is incorrect, resource manager 100 increments counter 105 or 110 based upon the current execution mode.

In addition, entry updater 120 receives branch resolution value 170 and increments/decrements the corresponding branch history table entry when the corresponding branch history table entry is assigned to the current execution mode. Entry updater 120 may not, however, update the corresponding branch history table entry when the branch history table entry is not assigned to the current execution mode that, in turn, reduces branch aliasing (see FIG. 3B and corresponding text for further details).

In one embodiment, resource manager 100, entry updater 120, branch predictor 130, and prediction analyzer 160 may be implemented in hardware logic. In another embodiment, resource manager 100, entry updater 120, branch predictor 130, and prediction analyzer 160 may be implemented in software subroutines. In yet another embodiment, resource manager 100, entry updater 120, branch predictor 130, and prediction analyzer 160 may be implemented in a combination of hardware logic and software subroutines.

Figure 2:
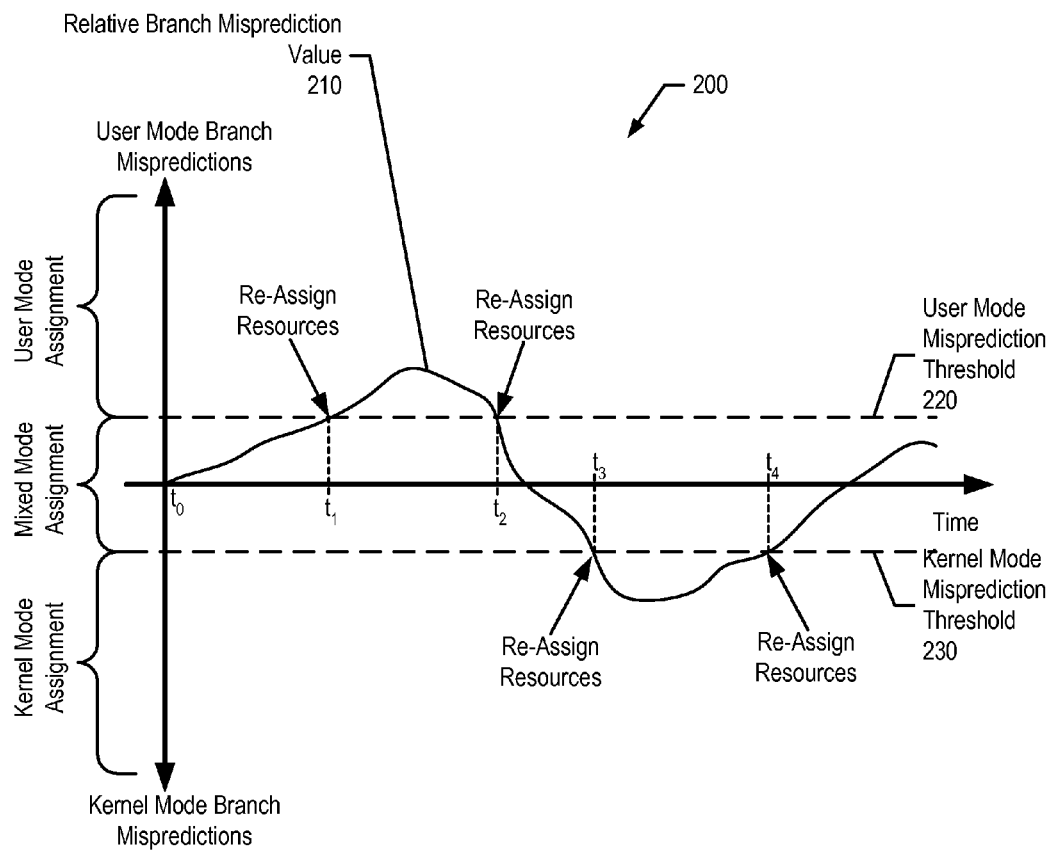
FIG. 2 is a diagram showing a timeline of relative branch mispredictions and reassigning resources when the number of relative branch mispredictions crosses a threshold.

FIG. 2 is a diagram showing a timeline of relative branch mispredictions and reassigning resources when the number of relative branch mispredictions crosses a threshold. Graph 200 shows a relative number of branch mispredictions between execution modes in time (user mode and kernel mode) as a processor executes code.

Relative branch misprediction value 210 represents the difference between the number of branch mispredictions that occur in user mode versus the number of branch mispredictions that occur in kernel mode. At time $t_0$, processing initially assigns resources to execution modes, such as assigning half of the branch history table entries to user mode and the other half of the branch history table entries to kernel mode. As processing executes, relative branch misprediction value 210 begins to increase, signifying that more branch mispredictions are occurring in user mode compared with the number of branch mispredictions that are occurring in kernel mode.

At time, $t_1$, relative branch misprediction value 210 crosses above user mode misprediction threshold 220 into a user mode assignment area (above user mode misprediction threshold 220). User mode misprediction threshold 220 is a threshold for user mode branch mispredictions compared with kernel mode branch mispredictions and, when relative branch misprediction value 210 exceeds this threshold, processing reassigns branch history table entries from kernel execution mode to user execution mode (see FIG. 3A and corresponding text for further details). By assigning more branch history table entries to user execution mode, the number of user mode branch mispredictions decreases because more resources are available to track branch history in user execution mode, which reduces branch aliasing between modes and thereby provides more accurate predictions in one or more modes.

At time $t_2$, relative branch misprediction value 210 crosses below user mode misprediction threshold 220 and enters a mixed mode assignment area (between user mode misprediction threshold 220 and kernel mode misprediction threshold 230). At this point, processing reassigns some of the branch history table entries to kernel execution mode (see FIG. 3A and corresponding text for further details). As time progresses, relative branch misprediction value 210 crosses kernel mode misprediction threshold 230 (time $t_3$) and enters a kernel mode assignment area (below kernel mode threshold 230). Kernel mode threshold 230 is a threshold for kernel mode branch mispredictions compared with user mode branch mispredictions and, when relative branch misprediction value 210 falls below this threshold, processing reassigns branch history table entries from user execution mode to kernel execution mode (see FIG. 3A and corresponding text for further details). Again, by assigning more branch history table entries to kernel execution mode, the number of kernel mode branch mispredictions decreases because more resources are available to track branch history in kernel execution mode, which reduces branch aliasing between modes and thereby provides more accurate predictions in one or more modes.

As time progresses, relative branch misprediction value 210 crosses above kernel mode threshold 230 and enters back into the mixed mode assignment area at time $t_4$. At this point, processing reassigns some of the branch history table entries from kernel execution mode to user execution mode (see FIG. 3A and corresponding text for further details). By dynamically reassigning branch history table entries based on relative branch mispredictions as discussed above, processing balances the number of branch mispredictions between different execution modes, which results in a desired branch predictability in each mode based on user requirements and workload phase behavior.

FIG. 3A is a table showing resources dynamically assigned to a particular execution mode. Table 300 includes columns 330-350 that correspond to times $t_0$-$t_4$ shown in FIG. 2. Table 300 also includes rows 310-325, which correspond to four branch history table entries, such as those in branch history table 125 shown in FIG. 1.

Column 330 shows that at time $t_0$, branch history table entries 0-1 are initially configured for user mode and entries 2-3 are initially configured for kernel mode since no mispredictions have occurred and, therefore, branch prediction resources are split in some proportion between user mode and kernel mode. In this example, the proportion is 50% user mode and 50% kernel mode.

At time $t_1$ (column 335), branch history table entries 2 and 3 are reassigned from kernel execution mode to user execution mode because the number of user execution mode branch mispredictions relative to the number of kernel execution mode branch mispredictions exceeds user execution mode misprediction threshold 220 shown in FIG. 2. As can be seen, entries 0-3 are each assigned to user execution mode. Meaning, when a processor is in user execution mode, each of branch history table entries 0-3 is available for updating and retrieving branch prediction values. While in kernel execution mode, however, none of branch history table entries 0-3 are available (see FIG. 3B and corresponding text for further details).

At time $t_2$ (column 340), branch history table entries 2 and 3 are reassigned from user execution mode to kernel execution mode because the number of relative branch mispredictions fall within the mixed mode area. At time $t_3$ (column 345), branch history table entries 0 and 1 are reassigned from user execution mode to kernel execution mode because the number of kernel execution mode branch mispredictions relative to the number of user execution mode branch mispredictions exceeds kernel execution mode misprediction threshold 230 shown in FIG. 2. And, at time $t_4$ (column 350), branch history table entries 0 and 1 are reassigned from kernel execution mode to user execution mode because the number of relative branch mispredictions fall within a mixed mode area.

FIG. 3B is a table showing entry updater and branch predictor actions based upon whether a branch history table entry is assigned to a current execution mode. Table 360 includes columns 365 and 370, which include actions that entry updater 120 and branch predictor 130 perform, respectively, based upon whether a particular branch history table entry is assigned to a current execution mode (user execution mode or kernel execution mode). Row 375 includes information that entry updater 120 and branch predictor 130 perform when a branch history table entry is assigned to the current execution mode, and row 380 includes information that entry updater 120 and branch predictor 130 perform when a branch history table entry is not assigned to the current execution mode.

As can be seen, when a branch history table entry is assigned to the current execution mode (row 375), entry updater 120 increments or decrements the branch history table entry's value based on branch resolution value 170. For example, if branch resolution value is "1" (indicating branch taken), then entry updater 120 increments the branch history table entry's value. And, in this example, if branch resolution value is "0" (indicating branch not taken), then entry updater 120 decrements the branch history table entry's value.

Regarding branch predictor 130, row 375 shows that, when a branch history table entry is assigned to a current execution mode, branch predictor 130 provides the branch history table entry's value to execution code 150 as a branch prediction value. For example, if a branch instruction's address hashed to branch history table entry 3, then branch predictor 130 retrieves the value stored in branch history table entry 3 and provides the retrieved value to execution code 150.

Row 380 shows that when a branch history table entry is not assigned to a current execution mode, entry updater 120 does not increment or decrement the branch history table entry's value, but rather holds the current value. Row 380 also shows that branch predictor 130 provides a "Take Branch" value (e.g., "1") to execution code 150 when a branch history table entry is not assigned to the current execution mode.

Figure 4:
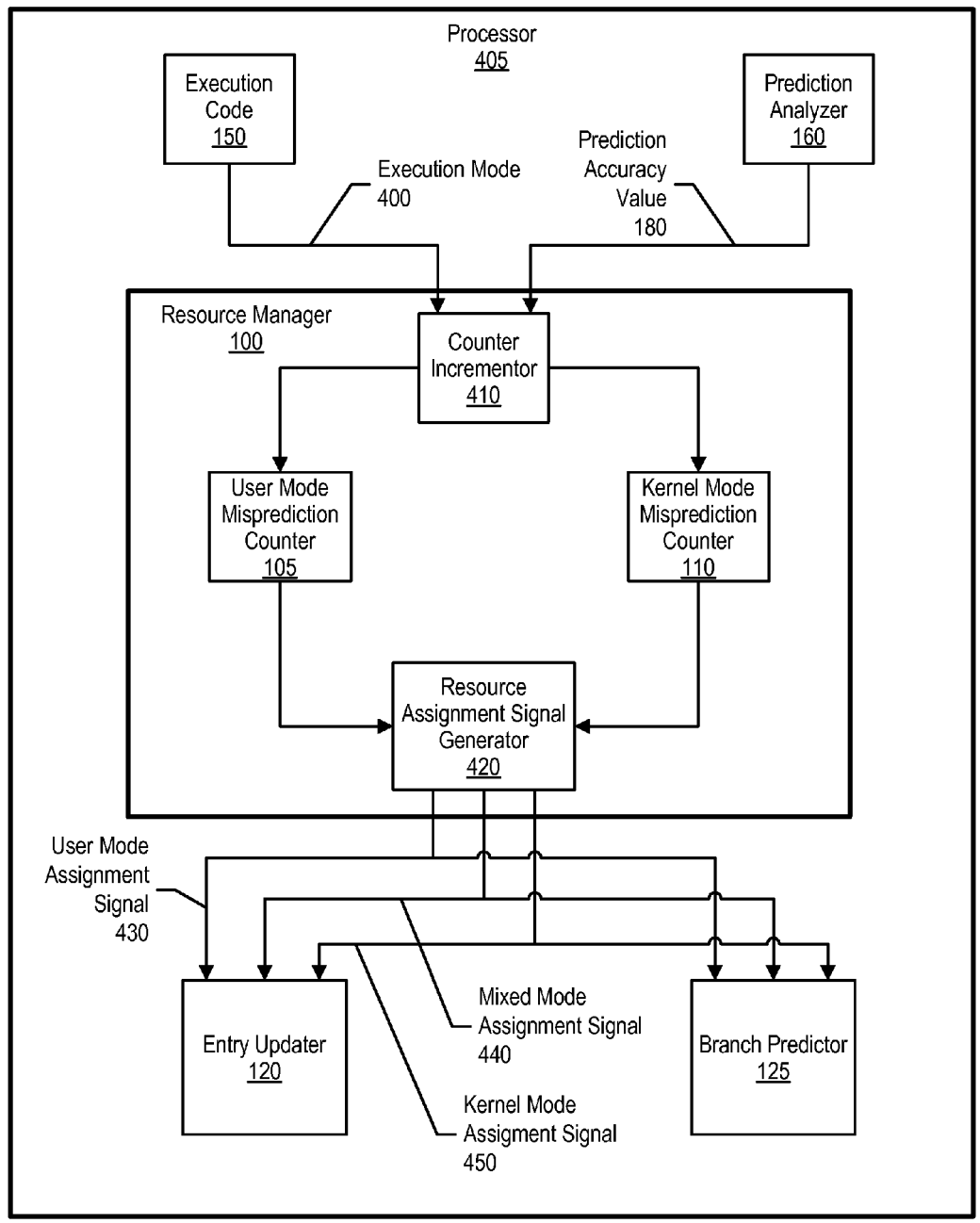
FIG. 4 is a diagram showing a resource manager using counters to track the number of branch mispredictions that occur while in various execution modes.

FIG. 4 is a diagram showing a resource manager using counters to track the number of branch mispredictions that occur while in various execution modes. Resource manager 100 includes counter incrementor 410, which receives execution mode 400 and prediction accuracy value 180 from execution code 150 and prediction analyzer 160, respectively. Execution mode 400 indicates a current execution mode, such as a value of "1" for user execution mode and a value of "0" for kernel execution mode. Prediction accuracy value 180 indicates whether a branch prediction for a branch instruction was correct, such as "1" for a correct prediction or "0" for an incorrect prediction. Prediction analyzer generates prediction accuracy value 180 by comparing a branch prediction with the actual branch resolution (see FIG. 1 and corresponding text for further details).

Counter incrementor 410 increments user mode misprediction counter 105 or kernel mode misprediction counter 110 based on the value of execution mode 400 and prediction accuracy value 180. When execution mode 400 indicates that the current execution mode is user execution mode, counter incrementor 410 increments user mode misprediction counter 105 when prediction accuracy value 180 indicates a misprediction. Likewise, when execution mode 400 indicates that the current execution mode is kernel execution mode, counter incrementor 410 increments kernel mode misprediction counter 110 when prediction accuracy value 180 indicates a misprediction.

In turn, resource assignment signal generator 420 compares the values included in counters 105 and 110 to determine whether to adjust resource assignment signals 430, 440, and 450. In one embodiment, when resource assignment signal generator 420 detects that the relative branch misprediction number between the user mode mispredictions and the kernel mode mispredictions exceeds a user mode misprediction threshold, resource assignment signal generator 420 activates user mode assignment signal 430 and deactivates mixed mode assignment signal 440 and kernel mode assignment signal 450. As such, entry updater 120 and branch predictor 125 are informed that, in one embodiment, each branch history table entry is assigned to user execution mode.

In one embodiment, when resource assignment signal generator 420 detects that the relative branch misprediction number between the user mode mispredictions and the kernel mode mispredictions falls in a mixed mode range, which is a value between a user mode misprediction threshold and a kernel mode misprediction threshold, resource assignment signal generator 420 activates mixed mode assignment signal 440 and deactivates user mode assignment signal 430 and kernel mode assignment signal 450. As such, entry updater 120 and branch predictor 125 are informed that, in one embodiment, a portion of the branch history table entries are assigned to user execution mode and a portion of the branch history table entries are assigned to kernel mode.

In one embodiment, when resource assignment signal generator 420 detects that the relative branch misprediction number between the user mode mispredictions and the kernel mode mispredictions exceeds the kernel mode misprediction threshold, resource assignment signal generator 420 activates kernel mode assignment signal 450 and deactivates user mode assignment signal 430 and mixed mode assignment signal 440. As such, entry updater 120 and branch predictor 125 are informed that, in one embodiment, each of the branch history table entries are assigned to kernel mode. As those skilled in the art can appreciate, different variations may be incorporated for assigning branch history table entries to a particular execution mode, including many different signals for dynamically splitting resources in various proportions between user mode and kernel mode as processing requires.

Figure 5:
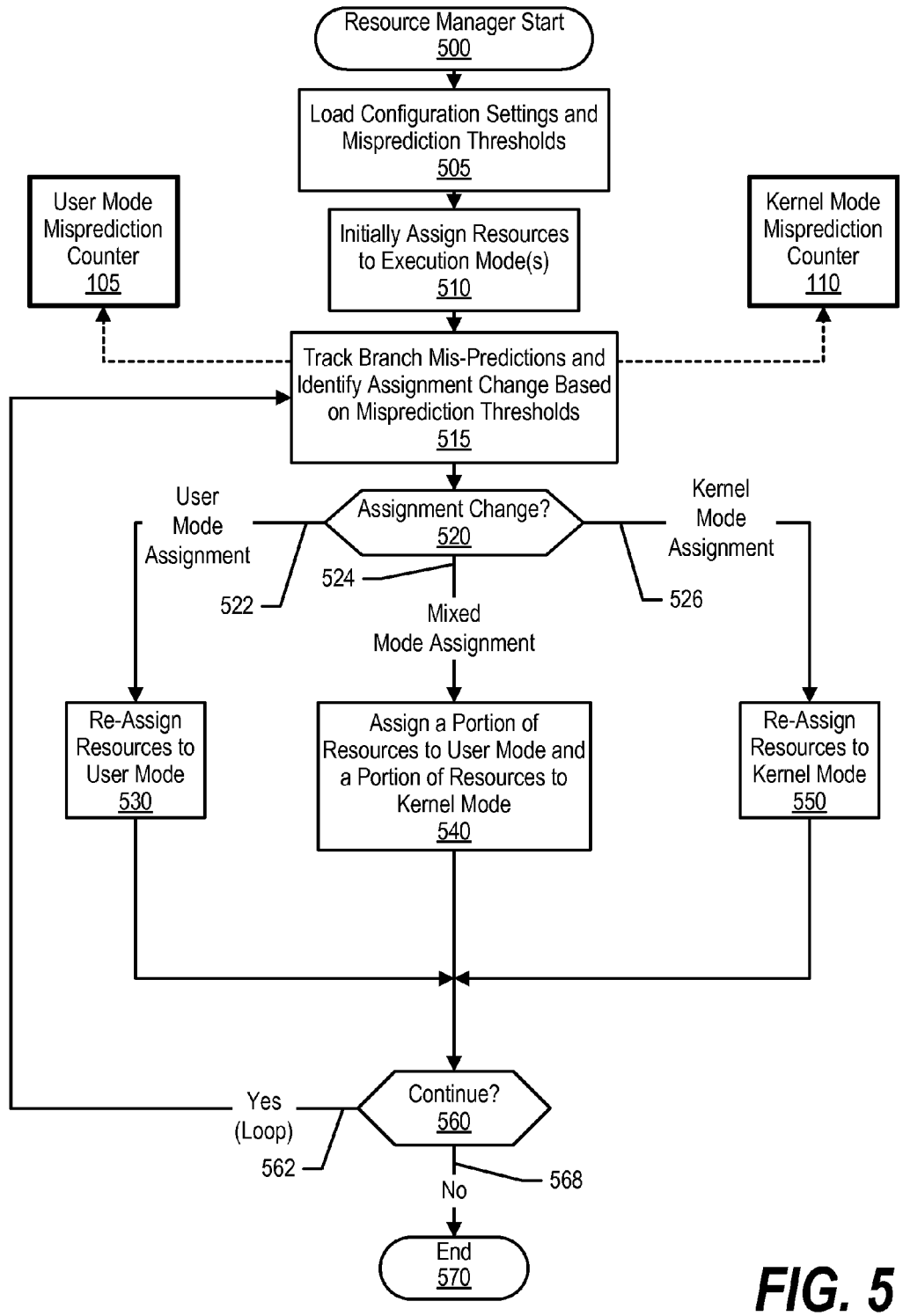
FIG. 5 is a flowchart showing steps taken in tracking branch mispredictions and assigning resources to execution modes accordingly.

FIG. 5 is a flowchart showing steps taken in tracking branch mispredictions and assigning resources to execution modes accordingly. Processing commences at 500, whereupon processing loads configuration settings and misprediction thresholds at step 505. For example, the configuration settings may instruct a processor to assign each branch history table entry to a particular execution mode, and the misprediction thresholds indicate a relative number of branch mispredictions when the processor should reassign resources (see FIG. 2 and corresponding text for further details). Processing, at step 510, initially assigns resources to execution modes based upon the configuration settings.

At step 515, processing commences code execution and a resource manager tracks branch mispredictions by incrementing counters 105 and 110 accordingly. At some point, the resource manager identifies an assignment change based upon the misprediction thresholds. In one embodiment, the resource manager subtracts the number of kernel mode branch mispredictions from the number of user mode branch mispredictions in order to derive a relative branch misprediction value. In this embodiment, the resource manager then uses the relative branch misprediction value to determine if a threshold is crossed. In another embodiment, the resource manager may use the number of branch mispredictions from either counter 105 or 110 to determine if a threshold is crossed (see FIGS. 2-4 and corresponding text for further details).

A determination is made as to the new assignment change (decision 520). For example, the resource manager may have assigned a portion of the branch history table entries to kernel mode and a portion of branch history table entries to user mode (mixed mode assignment). In this example, the number of user mode branch mispredictions may have increased above the user mode threshold, indicating to the resource manager to reassign resources from kernel mode to user mode in order to decrease the number of user mode branch mispredictions.

If the resource manager determines to switch to user mode assignment, decision 520 branches to "User Mode Assignment" branch 522, whereupon the resource manager reassigns resources from kernel mode to user mode (step 530). Referring to FIGS. 2 and 3A, at time $t_1$, the resource manager reassigns branch history table entries 2 and 3 from kernel mode to user mode. In one embodiment, resource reassignment may be accomplished using separate masks of the bits in a branch address to hash into the BHT entries. In this example, bits in the address are unmasked to allow more entries to be accessed in user mode, while correspondingly more bits are masked to reduced access to entries in kernel mode. The bits used in each mode may be masked such that use of entries is non-overlapped between modes, or such that use of some small portion of entries is overlapped between modes. In the latter case, the number of overlapped entries may be minimized to reduce aliasing between modes. Some overlapping may be required to reduce the complexity of the logic to assign branch prediction resources.

However, if the resource manager determines to switch to mixed mode assignment, decision 520 branches to "Mixed Mode Assignment" branch 524, whereupon the resource manager assigns a portion of the resources to user mode and a portion of the resources to kernel mode (step 540). Referring to FIGS. 2 and 3A, at time $t_2$, the resource manager reassigns branch history table entries 2 and 3 from user mode to kernel mode. And, at time $t_4$, the resource manager reassigns branch history table entries 0 and 1 from kernel mode to user mode.

On the other hand, if the resource manager determines to switch to kernel mode assignment, decision 520 branches to "Kernel Mode Assignment" branch 526, whereupon the resource manager reassigns resources from user mode to kernel mode (step 550). Referring to FIGS. 2 and 3A, at time $t_3$, the resource manager reassigns branch history table entries 0 and 1 from user mode to kernel mode.

Once resources are reassigned, a determination is made as to whether to continue tracking branch mispredictions (decision 560). If the resource manager should continue to track branch mispredictions, decision 560 branches to "Yes" branch 562, whereupon processing loops back to continue tracking branch mispredictions and reassigning resources accordingly. This looping continues until the resource manager should stop tracking branch mispredictions, at which point decision 560 branches to "No" branch 568 whereupon processing ends at 570.

Figure 6:
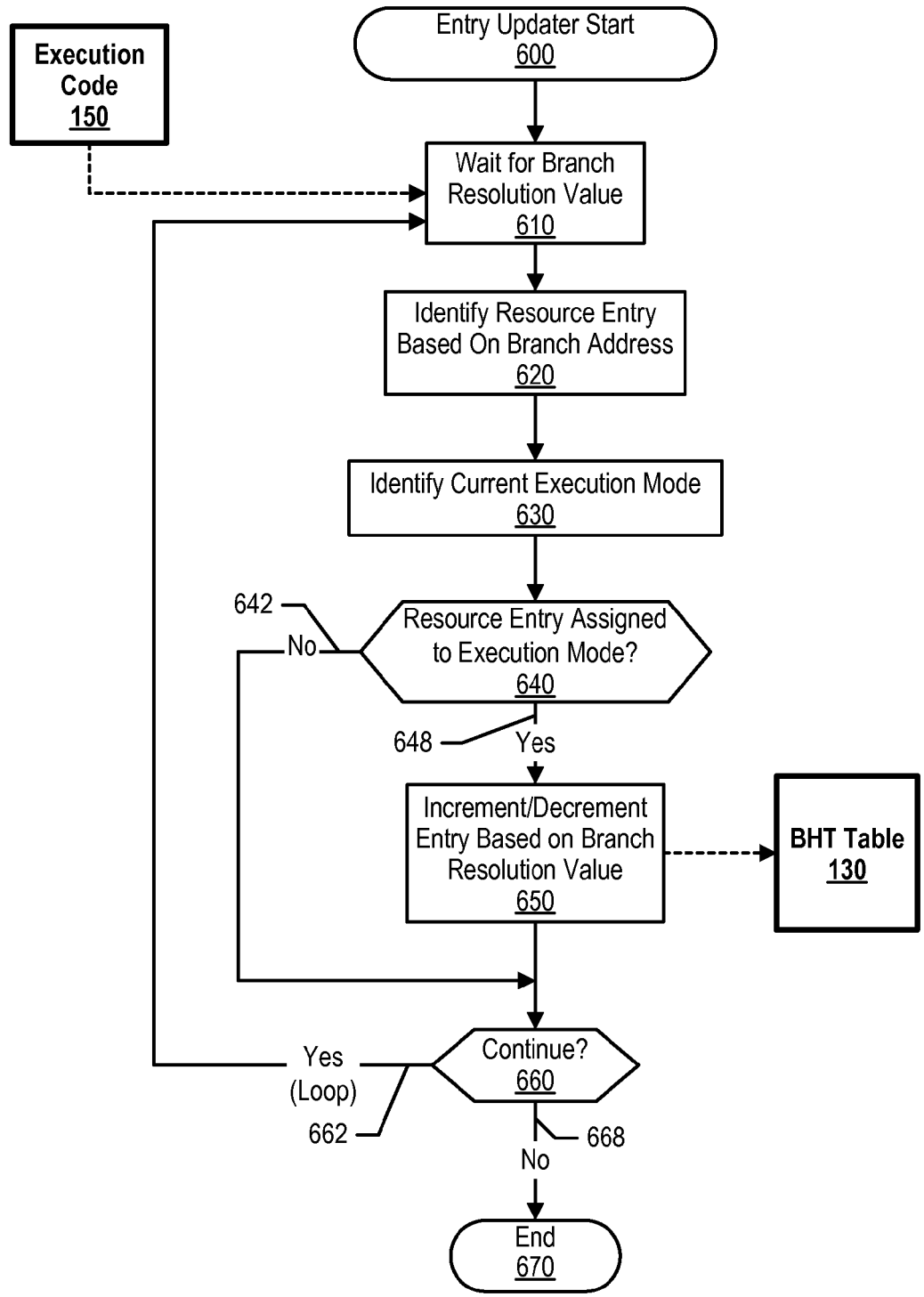
FIG. 6 is a flowchart showing steps taken in updating branch history table entries based upon whether a branch history table entry is assigned to a current execution mode.

FIG. 6 is a flowchart showing steps taken in updating branch history table entries based upon whether a branch history table entry is assigned to a current execution mode. When execution code provides a branch resolution value for a branch instruction, entry updater 120 (e.g., logic or a software subroutine) determines whether a corresponding branch history table entry is assigned to the current execution mode. If so, entry updater 120 updates (increments or decrements) the corresponding branch history table entry. However, if the branch history table entry is not assigned to the current execution mode, entry updater 120 does not update the branch history table entry (see FIG. 3B and corresponding text for further details).

Processing commences at 600, whereupon processing waits for a branch resolution value from execution code 150 (step 610). At step 620, processing identifies a branch history table entry based upon the branch address. For example, processing may perform a hash function using a program counter value that corresponds to the branch instruction. In this example, the resultant hash function is utilized to select a corresponding branch history table entry.

Processing identifies the execution mode in which the processor is executing at step 630 (e.g., user mode or kernel mode). A determination is made as to whether the corresponding branch history table entry is assigned to the current execution mode (decision 640). For example, processing may identify that branch history table entry 2 corresponds to the branch instruction and, in this example, processing may determine that branch history table entry 2 is assigned to user mode, and the current execution mode is user mode.

If the resource entry is assigned to the current execution mode, decision 640 branches to "Yes" branch 648 whereupon processing increments or decrements the corresponding branch history table entry in branch history table 130 based upon the branch resolution value (step 650). For example, the branch resolution value may indicate that the branch was taken (e.g., value of "1"). In this example, processing increments the branch history table entry accordingly.

On the other hand, if the resource entry is not assigned to the current execution mode, decision 640 branches to "No" branch 642, bypassing the branch history table entry update step (see FIG. 3B and corresponding text for further details).

A determination is made as to whether to continue monitoring branch resolution values and updating branch history table entries (decision 660). If processing should continue, decision 660 branches to "Yes" branch 662, which loops back to continue monitoring branch resolution values and updating branch history table entries. This looping continues until processing should terminate, at which point decision 660 branches to "No" branch 668 whereupon processing ends at 670.

Figure 7:
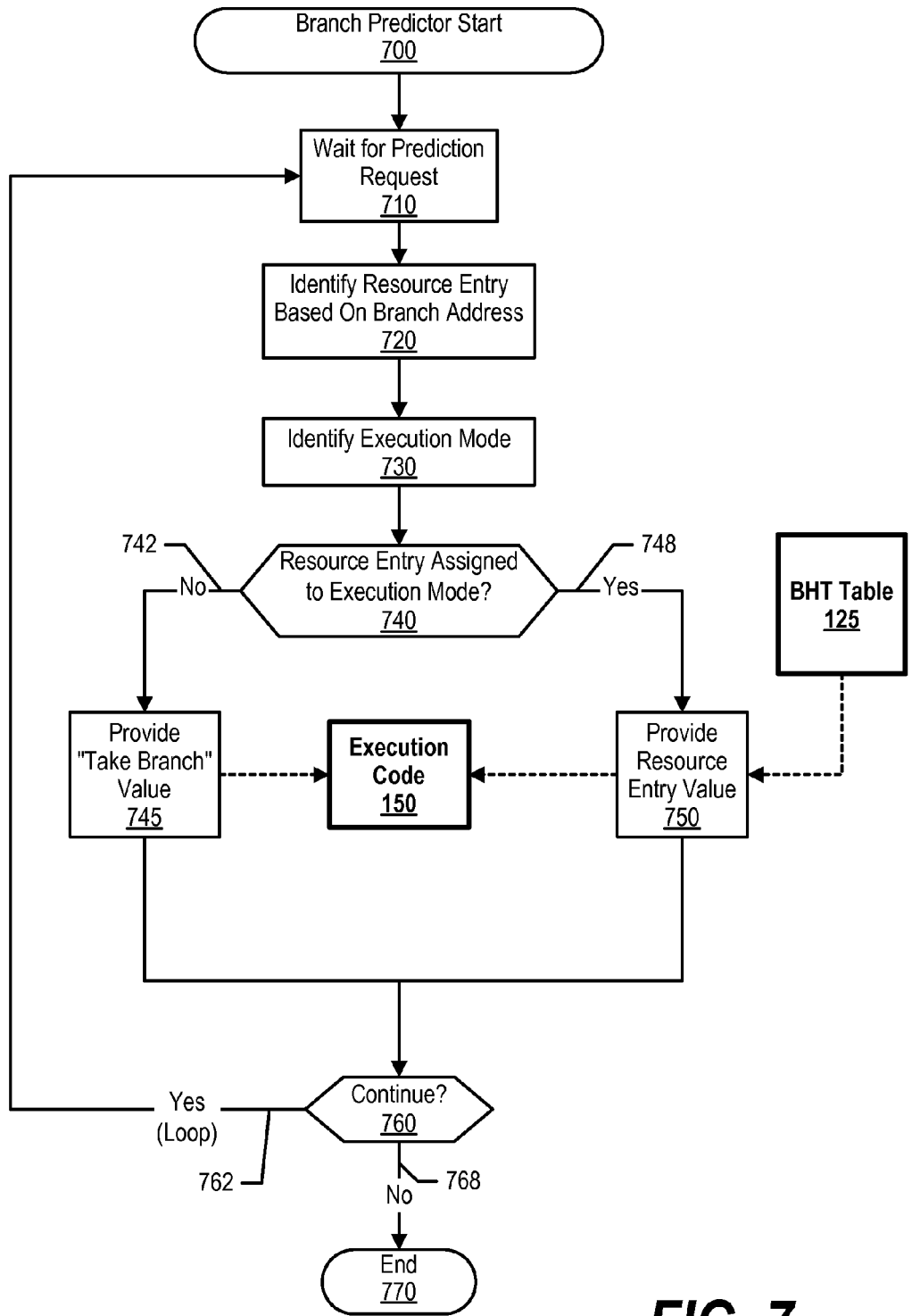
FIG. 7 is a flowchart showing steps taken in providing branch prediction values based upon whether a branch history table entry is assigned to a current execution mode.

FIG. 7 is a flowchart showing steps taken in providing branch prediction values based upon whether a branch history table entry is assigned to a current execution mode. When execution code requests a branch prediction for a particular branch instruction, branch predictor 130 (e.g., logic or a subroutine) determines whether a branch history table entry corresponding to the branch instruction's address (e.g., program counter value) is assigned to the current execution mode. If so, branch predictor 130 provides a branch history table entry value located in the corresponding branch history table entry as branch prediction value 140. However, if the branch history table entry is not assigned to the current execution mode, branch predictor 130 provides a default "take branch" value to execution code 150 as branch prediction value 140 (see FIG. 3B and corresponding text for further details).

Processing commences at 700, whereupon processing waits for a branch prediction request from execution coded 150 (step 710). At step 720, processing identifies a resource entry that corresponds to the branch instruction's address. For example, processing may perform a hash function using a program counter value that corresponds to the branch instruction. In this example, the resultant hash function is utilized to select a corresponding branch history table entry.

Processing identifies the execution mode in which the processor is executing at step 730 (e.g., user mode or kernel mode). A determination is made as to whether the corresponding branch history table entry is assigned to the current execution mode (decision 740). For example, processing may identify that branch history table entry 2 corresponds to the branch instruction and, in this example, processing may determine that branch history table entry 2 is assigned to user mode, and the current execution mode is user mode.

If the resource entry is not assigned to the current execution mode, decision 740 branches to "No" branch 742 whereupon processing provides a "Take Branch" value (e.g., "1") to execution code 150 at step 745. On the other hand, if the resource entry is assigned to the current execution mode, decision 740 branches to "Yes" branch 748, whereupon processing provides the branch history table entry value from the corresponding branch history table entry in branch history table 125 to execution code 150 (step 750).

A determination is made as to whether to continue providing branch predictions to execution code 150 (decision 760). If processing should continue, decision 760 branches to "Yes" branch 762, which loops back to continue providing branch predictions. This looping continues until processing should terminate, at which point decision 760 branches to "No" branch 768 whereupon processing ends at 770.

Figure 8:
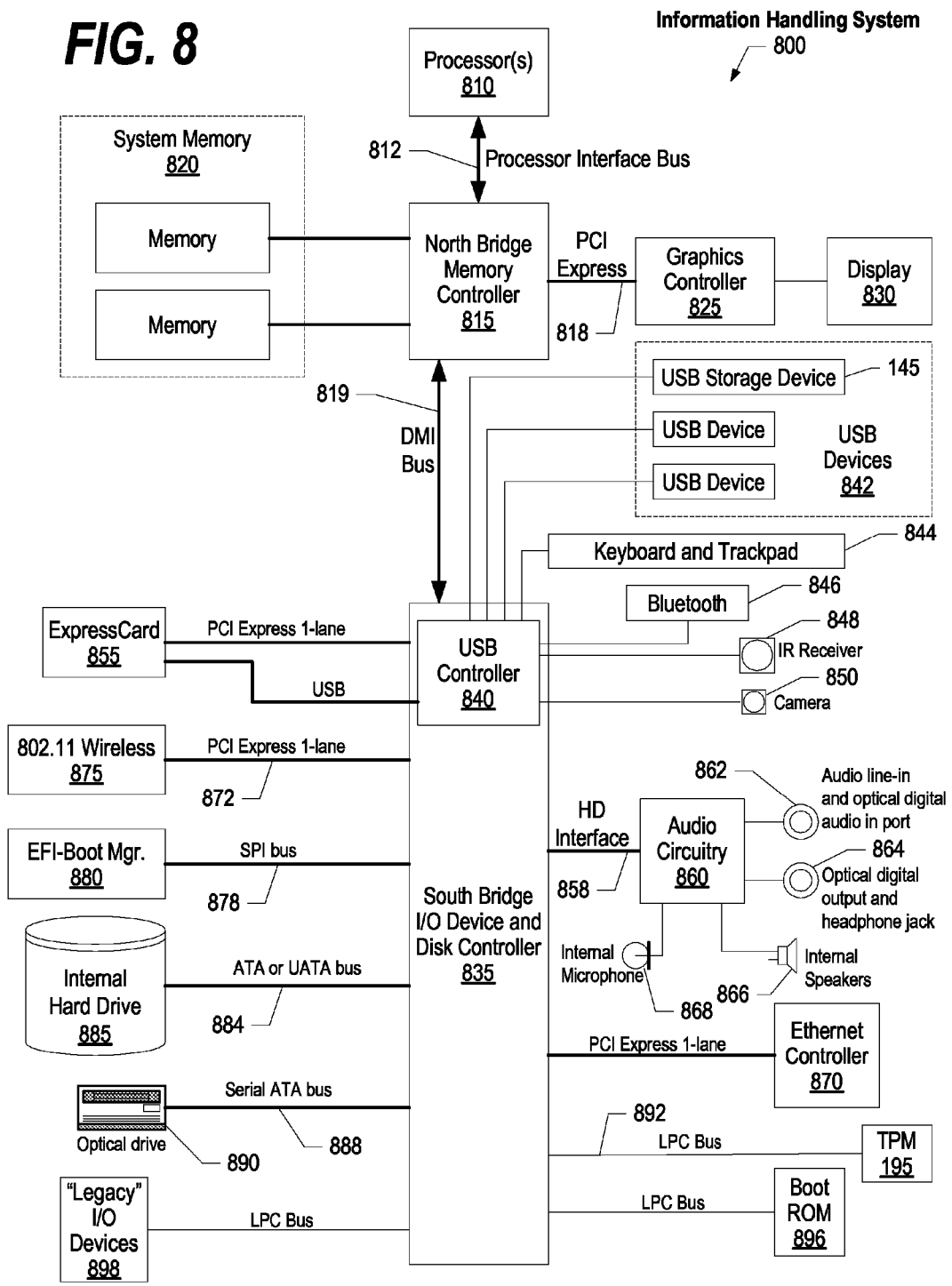
FIG. 8 is a block diagram example of a data processing system in which the methods described herein can be implemented.

FIG. 8 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, et cetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   assigning a branch history resource to a first execution mode using a processor;
   logging a first number of branch mispredictions that occur while executing the first execution mode;
   logging a second number of branch mispredictions that occur while executing a second execution mode;
   generating a relative branch misprediction number based upon the first number of branch mispredictions and the second number of branch mispredictions; and
   reassigning the branch history resource to the second execution mode using the processor in response to comparing the relative branch misprediction number with one or more branch misprediction thresholds.

2. The method of claim 1 wherein:
   the first execution mode is a kernel execution mode and the second execution mode is a user execution mode; and
   the branch history resource is a branch history table entry.

3. The method of claim 1 wherein a branch history table includes a plurality of branch history table entries, the branch history table resource being one of the plurality of branch history table entries, the method further comprising:
   assigning a first portion of the plurality of the branch history table entries to the first execution mode; and
   assigning a second portion of the plurality of the branch history table entries to the second mode.

4. The method of claim 1 wherein, after the reassigning, the method further comprises:
   receiving a branch resolution value that indicates a branch direction;
   determining that the branch instruction corresponds to the branch history resource;
   determining that the second execution mode is currently executing; and
   incrementing a branch history value stored in the branch history resource in response to determining that both the branch instruction corresponds to the branch history resource and the second execution mode is currently executing.

5. The method of claim 1 wherein, after the reassigning, the method further comprises:
   receiving a branch prediction request that includes a branch instruction address;
   determining that the branch instruction address corresponds to the branch history resource;
   determining that the second execution mode is currently executing;
   retrieving a branch history value from the branch history resource in response to determining that both the branch instruction address corresponds to the branch history resource and the second execution mode is currently executing; and
   sending the retrieved branch history value.

6. The method of claim 1 wherein, after the reassigning, the method further comprises:
   receiving a branch prediction request that includes a branch instruction address;
   determining that the branch instruction address corresponds to the branch history resource;
   determining that the first execution mode is currently executing; and
   sending a take branch value in response to determining that both the branch instruction address corresponds to the branch history resource and the first execution mode is currently executing.

7. An information handling system comprising:
   one or more processors;
   a memory accessible by at least one of the processors;
   a nonvolatile storage area accessible by at least one of the processors;
   a set of instructions stored in the memory and executed by at least one of the processors in order to perform actions of:
      assigning a branch history resource to a first execution mode using a processor;
      logging a first number of branch mispredictions that occur while executing the first execution mode;
      logging a second number of branch mispredictions that occur while executing a second execution mode;
      generating a relative branch misprediction number based upon the first number of branch mispredictions and the second number of branch mispredictions; and
      reassigning the branch history resource to the second execution mode using the processor in response to comparing the relative branch misprediction number with one or more branch misprediction thresholds.

8. The information handling system of claim 7 wherein the first execution mode is a kernel execution mode and the second execution mode is a user execution mode, the information handling system further comprising a branch history table entry as the branch history resource.

9. The information handling system of claim 7 wherein a branch history table includes a plurality of branch history table entries, the branch history table resource being one of the plurality of branch history table entries, and wherein the set of instructions, when executed by at least one of the processors, further performs actions of:
   assigning a first portion of the plurality of the branch history table entries to the first execution mode; and
   assigning a second portion of the plurality of the branch history table entries to the second mode.

10. The information handling system of claim 7 wherein, after the reassigning, the set of instructions, when executed by at least one of the processors, further performs actions of:
   receiving a branch resolution value that indicates a branch direction;
   determining that the branch instruction corresponds to the branch history resource;
   determining that the second execution mode is currently executing; and
   incrementing a branch history value stored in the branch history resource in response to determining that both the branch instruction corresponds to the branch history resource and the second execution mode is currently executing.

11. The information handling system of claim 7 wherein, after the reassigning, the set of instructions, when executed by at least one of the processors, further performs actions of:
   receiving a branch prediction request that includes a branch instruction address;
   determining that the branch instruction address corresponds to the branch history resource;
   determining that the second execution mode is currently executing;

retrieving a branch history value from the branch history resource in response to determining that both the branch instruction address corresponds to the branch history resource and the second execution mode is currently executing; and sending the retrieved branch history value.

12. The information handling system of claim 7 wherein, after the reassigning, the set of instructions, when executed by at least one of the processors, further performs actions of:

receiving a branch prediction request that includes a branch instruction address;

determining that the branch instruction address corresponds to the branch history resource;

determining that the first execution mode is currently executing; and sending a take branch value in response to determining that both the branch instruction address corresponds to the branch history resource and the first execution mode is currently executing.

13. A computer program product stored in a non-transitory computer readable storage medium, comprising functional descriptive material that, when executed by an information handling system, causes the information handling system to perform actions that include:

assigning a branch history resource to a first execution mode using a processor;

logging a first number of branch mispredictions that occur while executing the first execution mode;

logging a second number of branch mispredictions that occur while executing a second execution mode;

generating a relative branch misprediction number based upon the first number of branch mispredictions and the second number of branch mispredictions; and reassigning the branch history resource to the second execution mode using the processor in response to comparing the relative branch misprediction number with one or more branch misprediction thresholds.

14. The computer program product of claim 13 wherein:

the first execution mode is a kernel execution mode and the second execution mode is a user execution mode; and the branch history resource is a branch history table entry.

15. The computer program product of claim 13 wherein a branch history table includes a plurality of branch history table entries, the branch history table resource being one of the plurality of branch history table entries, and wherein the functional descriptive material, when executed by the information handling system, causes the information handling system to further perform actions of:

assigning a first portion of the plurality of the branch history table entries to the first execution mode; and assigning a second portion of the plurality of the branch history table entries to the second mode.

16. The computer program product of claim 13 wherein, after the reassigning, the functional descriptive material, when executed by the information handling system, causes the information handling system to further perform actions of:

receiving a branch resolution value that indicates a branch direction;

determining that the branch instruction corresponds to the branch history resource;

determining that the second execution mode is currently executing; and incrementing a branch history value stored in the branch history resource in response to determining that both the branch instruction corresponds to the branch history resource and the second execution mode is currently executing.

17. The computer program product of claim 13 wherein, after the reassigning, the functional descriptive material, when executed by the information handling system, causes the information handling system to further perform actions of:

receiving a branch prediction request that includes a branch instruction address;

determining that the branch instruction address corresponds to the branch history resource;

determining that the second execution mode is currently executing;

retrieving a branch history value from the branch history resource in response to determining that both the branch instruction address corresponds to the branch history resource and the second execution mode is currently executing; and sending the retrieved branch history value.

* * * * *